United States Patent
Kalhan et al.

(10) Patent No.: US 9,706,369 B2
(45) Date of Patent: Jul. 11, 2017

(54) HANDOVER MANAGEMENT USING A BROADCAST CHANNEL IN A NETWORK HAVING SYNCHRONIZED BASE STATIONS

(71) Applicant: Kyocera Corporation, Kyoto (JP)

(72) Inventors: Amit Kalhan, San Diego, CA (US);
Henry Chang, San Diego, CA (US);
Douglas Dunn, San Diego, CA (US);
David Comstock, San Diego, CA (US)

(73) Assignee: Kyocera Corporation, Kyoto (JP)

( * ) Notice: Subject to any disclaimer, the term of this patent is extended or adjusted under 35 U.S.C. 154(b) by 87 days.

(21) Appl. No.: 14/358,325

(22) PCT Filed: Nov. 12, 2012

(86) PCT No.: PCT/US2012/064700
§ 371 (c)(1),
(2) Date: May 15, 2014

(87) PCT Pub. No.: WO2013/074457
PCT Pub. Date: May 23, 2013

(65) Prior Publication Data
US 2014/0313969 A1 Oct. 23, 2014

Related U.S. Application Data

(60) Provisional application No. 61/559,860, filed on Nov. 15, 2011.

(51) Int. Cl.
*H04H 20/71* (2008.01)
*H04W 4/00* (2009.01)
(Continued)

(52) U.S. Cl.
CPC ......... *H04W 4/06* (2013.01); *H04W 36/0072* (2013.01); *H04W 52/0203* (2013.01);
(Continued)

(58) Field of Classification Search
CPC ............. H04W 36/32; H04W 36/0083; H04W 36/0061; H04W 56/00; H04J 11/0069
See application file for complete search history.

(56) References Cited

U.S. PATENT DOCUMENTS 6,711,408 B1 * 3/2004 Raith ................... H04W 36/32
340/988
8,824,350 B2 * 9/2014 Zhang ................ H04W 72/005
370/312
(Continued)

FOREIGN PATENT DOCUMENTS

EP 1 819 186 8/2007
EP 2 302 969 3/2011
(Continued)

OTHER PUBLICATIONS

"Guidelines for using cdma2000 1x Revision E Features on Earlier Revisions"; 3rd Generation Partnership Project 2, TSG-C; 3GPP2 C.S0099-0; Version 2.0; Jul. 2011.
(Continued)

*Primary Examiner* — Melanie Jagannathan (57) ABSTRACT

Handovers of mobile wireless communications device from a source base station to a target base station are managed by transmitting handover information over a shared broadcast channel. The handover information required by a mobile wireless communication device for performing a handover may be transmitted within a Multicast Broadcast Multimedia Services (MBfviS) Single Frequency Network (M8SFN) subframe in some circumstances. In one example, the handover information includes Uplink (UL) allocation information, timing advance (TA) information, and a Cell Radio Network Temporary Identifier (C-RNTI), The synchronization between base stations of the MBMS system allows for the elimination of some messaging required in conventional systems for synchronization between the mobile wireless
(Continued)

communication service and a target base station. As a result the time for performing a handover is reduced.

25 Claims, 4 Drawing Sheets

(51) Int. Cl.
H04W 4/06 (2009.01)
H04W 36/00 (2009.01)
H04W 52/02 (2009.01)
H04W 72/00 (2009.01)
H04W 36/32 (2009.01)

(52) U.S. Cl.
CPC ...... *H04W 72/005* (2013.01); *H04W 36/0077* (2013.01); *H04W 36/32* (2013.01)

(56) References Cited

U.S. PATENT DOCUMENTS

| | | | |
|---|---|---|---|
| 2008/0225796 A1 | 9/2008 | Malladi et al. | |
| 2008/0268833 A1 | 10/2008 | Huang et al. | |
| 2008/0318578 A1* | 12/2008 | Worrall | H04W 36/02 455/437 |
| 2009/0129341 A1 | 5/2009 | Balasubramanian et al. | |
| 2009/0156225 A1 | 6/2009 | Angelow et al. | |
| 2009/0201881 A1* | 8/2009 | Chun | H04J 11/0069 370/331 |
| 2009/0252077 A1* | 10/2009 | Khandekar | H04W 72/082 370/312 |
| 2009/0312008 A1 | 12/2009 | Lindoff et al. | |
| 2010/0008282 A1 | 1/2010 | Bhattad et al. | |
| 2010/0178895 A1* | 7/2010 | Maeda | H04W 76/007 455/404.1 |
| 2010/0208603 A1* | 8/2010 | Ishii | H04B 1/7113 370/252 |
| 2010/0272004 A1 | 10/2010 | Maeda et al. | |
| 2010/0315963 A1 | 12/2010 | Jading et al. | |
| 2011/0058513 A1* | 3/2011 | Ai | H04W 56/00 370/312 |
| 2011/0190011 A1* | 8/2011 | Choi | H04L 5/0007 455/466 |
| 2011/0294508 A1* | 12/2011 | Min | H04W 36/0083 455/436 |
| 2013/0028161 A1 | 1/2013 | Maeda et al. | |
| 2013/0040691 A1 | 2/2013 | Ode et al. | |
| 2014/0293858 A1 | 10/2014 | Kalhan et al. | |
| 2014/0034805 A1 | 11/2014 | Kalhan et al. | |

FOREIGN PATENT DOCUMENTS

| | | |
|---|---|---|
| WO | WO 2008/118064 | 10/2008 |
| WO | WO 2008/134554 | 11/2008 |
| WO | WO 2008/135933 | 11/2008 |
| WO | WO 2008/157717 | 12/2008 |
| WO | WO 2009/113918 | 9/2009 |
| WO | WO 2011/135693 | 11/2011 |
| WO | WO 2011/135825 | 11/2011 |
| WO | WO 2013/074458 | 5/2013 |
| WO | WO 2013/074460 | 5/2013 |
| WO | WO 2013/074461 | 5/2013 |

OTHER PUBLICATIONS

"Femtocell activities in 3GPP2 TSG-C"; Tiedemann, Edward G; Mar. 31, 2009; New Orleans, LA; XP002606265.
"Service Information Exchange for MBMS Service Continuity"; Alcatel Lucent et al.; 3GPP TSP-RAN WG3 Meeting #74; San Francisco, CA; Nov. 2011.

* cited by examiner

HANDOVER MANAGEMENT USING A BROADCAST CHANNEL IN A NETWORK HAVING SYNCHRONIZED BASE STATIONS

The present application claims priority to Provisional Application No. 61/559,860 entitled "Different Frequency Neighboring Cell MBSFN Subframe," filed Nov. 15, 2011, assigned to the assignee hereof and hereby expressly incorporated by reference in their entirety.

REFERENCE TO CO-PENDING APPLICATIONS FOR PATENT

The present application relates to PCT Application No. PCT/US2012/064704, entitled "NODE DETECTION IN A CELLULAR COMMUNICATION NETWORK," filed on even date herewith, and assigned to the assignee hereof and expressly incorporated by reference herein; to PCT Application No. PCT/US2012/064707, entitled "Inter-cell Messaging Using MBSFN Subframe," filed concurrently with this application, and assigned to the assignee hereof and expressly incorporated by reference herein and to and to PCT Application No. PCT/US2012/064708, entitled "Handover Signaling Using an MBSFN in a Cellular Communication System," filed concurrently with this application, and assigned to the assignee hereof and expressly incorporated by reference herein.

FIELD

This invention generally relates to wireless communications and more particularly to a wireless communication system where at least some information needed by a mobile communication device for performing a handover is transmitted within a broadcast channel shared by synchronized base stations

BACKGROUND

Cellular a id other wireless communication systems use be stations to provide wireless service to mobile wireless communication devices. Depending on the particular technology and preferences, a base station may be referred to as transceiver station, access node, access point, transceiver node, eNodeB, and eNB, as well as by other terms.

Base station, in cellular communication systems provide communications services to wireless communication devices within geographical cells where each as station exchanges signals with wireless communication devices within an associated cell. The size and shape of each cell is determined by several factors and are at least partially based on design parameters of the base station. In addition to large macro cells that provide services to numerous devices within relatively large geographical areas, some cellular communication systems are increasingly employing smaller cells to increase efficiency, improve coverage, improve the quality of service, and provide additional services. The smaller cells may include a variety or sizes typically referred to as microcells, picocells, and femtocells.

When a mobile wireless communication device moves from one cell to another, conventional systems require the mobile wireless communication device to perform a handover procedure. As the speed of the mobile wireless communication device increases, the handovers occur more frequently and the efficiency of the communication system diminishes.

SUMMARY

Handovers of mobile wireless communication device from a source base station to a target base station are managed by transmitting handover information over a shared broadcast channel. The handover information required by a mobile wireless communication device for performing a handover may be transmitted within a Multicast Broadcast Multimedia Services (MBMS) Single Frequency Network (MBSFN) subframe in some circumstances. In one example, the handover information includes Uplink (UL) allocation information, timing advance (TA) information, and a Cell Radio Network Temporary Identifier (C-RNTI). The synchronization between base stations of the MBMS system allows for the elimination of some messaging required in conventional systems for synchronization between the mobile wireless communication service and a target base station. As a result, the time for performing a handover and the amount of signaling overhead are reduced.

DETAILED DESCRIPTION

As described above, frequent handovers due to high speed of a mobile wireless communication device results in inefficient communication service, at a minimum. One example where the problem is evident occurs on high speed trains. High-speed railway is growing tremendously. The high speed, however, presents a challenge to provide reliable communications for travelers. Presently, high-speed railways' communication falls far short of users' demand. In order to support reliable communications for travelers, the network deployment must resolve two types of challenges. First, at high speed, such as above 250 km/h, mobile wireless communication devices pass through multiple cells in a very short time. This causes excessive signaling load to the network and will often lead to dropped calls. Second, current networks, it can take up to 6 seconds for a mobile wireless communication device to complete a handover between cells, while it usually takes much less than 6 seconds for high-speed trains at top speed to pass through the overlap region of two cells. As a result, mobile, wireless communication devices cannot re complete handovers leading to dropped calls.

Conventional techniques for the handover procedure include the transmission of several messages to and from the mobile wireless communication device. The conventional handover messages provide information to the mobile wireless communication device and enable synchronization of the mobile wireless communication device to the target base station. The time required to execute and process these messages results in delays in completing the handover. For mobile wireless communication devices traveling on high speed trains, these delays can be significant and greatly reduce data throughput. For the examples described herein, however, the delays are reduced by eliminating at least some of the message by implementing a reduced messaging handover procedure where handover information is broadcast over a shared channel. The handover information required by the mobile wireless communication device to execute a handover from a source base station to a target base station is provided to the mobile wireless communication device over a shared broadcast channel, such as a MBFSN subframe, that is broadcast by the target base station.

Figure 1A:
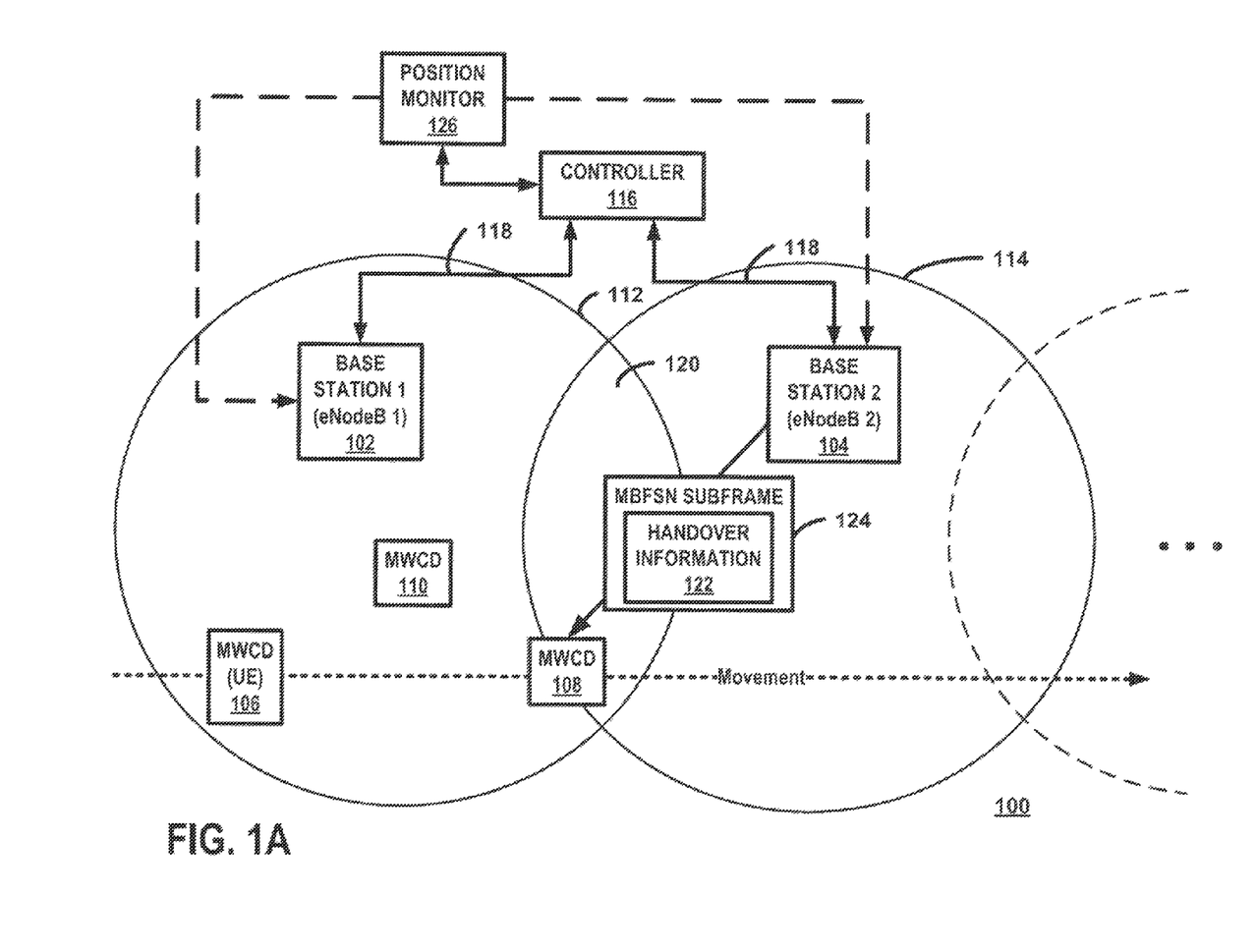
FIG. 1A is a block diagram of a communication system where handover information is broadcast to a mobile wireless communication device.

FIG. 1A is a block diagram of a communication system 100 in a plurality of base stations 102, 104 providing wireless communication service to mobile wireless communication devices 106, 108, 110. Each base station can communicate with mobile wireless communication devices within a geographic service area 112, 114 of the base station. The geographic service areas 112, 114, often referred to as cells, may be any of numerous shapes and sizes and typically overlap with adjacent geographic service areas. The various functions and operations of the blocks described with reference to the communication system 100 may be implemented in any number of devices, circuits, or elements. Two or more of the functional blocks may be integrated in a single device and the functions described as performed in any single device may be implemented over several devices. For example, at least portions of the functions of the controller may be performed by the base stations.

The base stations 102, 104 are fixed transceiver stations, sometimes referred to as eNodeBs or eNBs, that may include controllers in some circumstances. The base stations are connected to a network controller 116 though a backhaul 118 which may include any combination of wired, optical, and/or wireless communication channels. In FIG. 1, a first base station 102 and a second base station 104 are shown. Each base station has a geographic service area 112, 114 where the areas overlap in an overlap region 120. In a typical implementation, several base stations are positioned to provide continuous, or nearly continuous coverage, within a large area.

The mobile communication devices 106, 108, 110 may be any kind of portable or mobile wireless transceiver device that can exchange wireless signals with the base stations 102, 104. Examples of wireless communication devices 106, 108, 110 sometimes referred to as User Equipment (UE), UE devices, handsets, mobiles, or portables, include devices such as cell phones, smart phones, transceiver cards, modem cards and other similar devices.

For the example of FIG. 1A, the first and second mobile wireless communication devices 106, 108 are traveling at a relatively high speed and the third mobile wireless communication device 110 is stationary or moving at pedestrian speeds. The second mobile wireless communication device 108 is within the overlap region 120 and is engaged in a handover in accordance with an embodiment of the invention. Although other techniques may be used in some circumstances, the network 100 identifies the mobile wireless communication devices that should use the managed handover with broadcasted handover information. Mobile wireless communication devices having a speed above a threshold, for example, are identified and instructed to use the reduced messaging handover procedure. An example of a suitable technique for identifying and notifying wireless mobile communication devices is described in patent application Ser. No. 13/590,818, entitled "HANDOVER MANAGEMENT BASED ON SPEEDS OF WIRELESS COMMUNICATION DEVICES", filed on Aug. 21, 2012 and is incorporated by reference herein in its entirety. Therefore, for the example of FIG. 1A, the first mobile wireless communication device 106 and the second mobile wireless communication device 108 are instructed by the network to engage in the reduced messaging handover procedure and the third mobile wireless communication device 110 engages in conventional handover messaging.

The first base station 102 is synchronized to the second base station 104. In a typical scenario, multiple base stations within a ire area are time synchronized to each other. For the examples herein, the communication system 100 operates in accordance with a Multi media Broadcast Multicast Service (MBMS) specification. Multimedia Broadcast Multicast Service (MBMS) is a Point-to-Multipoint (PTM) interface specification designed to provide efficient delivery of broadcast and multicast services within 3rd Generation Partnership Project (3GPP) cellular networks. Examples of MBMS interface specifications include those described in Universal Mobile Telecommunications System ((UMTS)) and Long Term Evolution (LTE) communication specifications. For broadcast transmission across multiple cells, the specifications define transmission over single-frequency network configurations. Intended applications it mobile TV, news, radio broadcasting, file delivers, emergency alerts, and others. When services are broadcasted by MBMS, all cells inside an MBSFN (Multimedia Broadcast multicast service Single Frequency Network) area transmit the same MBMS service. MBMS requires that all base stations within at least a given geographic area be time synchronized for any given frequency channel. As a result, adjacent base stations such as the first base station 102 and the second base station 104 are synchronized. The techniques described herein, however, may be applied to other systems having synchronized base stations where the systems do not provide MBMS.

In order for a mobile wireless communication device to communicate with a base station, it first time-aligns the start of its radio frames with the frames received from the base station. The mobile wireless communication device's uplink transmissions must compensate for the propagation delay to the base station. The mobile wireless communication device initiates access to a base station by transmitting a preamble sequence from which the base station determines the propagation delay from the mobile wireless communication device. The base station provides a Timing Advance parameter to the mobile wireless communication device, which it uses to compensate for the propagation delay. The transmission subframe format for MBSFN is designed so that mobile wireless communication devices in any part of the cell can receive them regardless of the propagation delay between the base station and a mobile wireless communication device.

In order to minimize delays experienced during a handover, the second base station 104 transmits handover information 122 to the mobile wireless communication device 108 without exchanging contention resolution messages. For example, Random Access Response messages and Contention Resolution messages are not transmitted by the target base station (second base station 104) and the target base station 104 does not receive a scheduled transmission before sending the handover information 122. The handover information 122 transmitted by the target base station at least includes the uplink (UL) allocation and the timing advance (TA). In some circumstances, the C-RNTI is also sent to the mobile wireless communication device 108. In one example, after receiving a Random Access Preamble message from the mobile wireless communication device, the target base station 104 sends the handover information 122 to the mobile wireless communication device 108 needed by the device 108 to complete a handover to the target base station. In another example, the target base station monitors uplink channels assigned to the mobile wireless communication device to determine timing advance and provides handover information without receiving a Random Access Preamble transmission from the mobile wireless communication device and without sending any Random Access Response messages or Contention Resolution messages contained within the synchronization process to the mobile wireless communication device.

The handover information 122 is transmitted within a MBSFN subframe although other messaging techniques may be used in some circumstances. Selecting a MBFSN subframe near the end of the frame increases efficiency in some circumstances.

For the examples herein, the network is aware of the position of the mobile wireless communication device. A position monitor 126 provides the base stations and/or the controller 116 with position information. The position monitor 126 may be any infrastructure or mechanism that provides the controller 116 and/or the base stations 102, 104 with adequate information for managing the timing of the communication between the be stations and mobile wireless communication devices. For the examples where the mobile wireless communication device is carried on a high-speed train, infrastructure used for monitoring the position and speed of the train is used as the position monitor for the communication systems. One example, of such an infrastructure includes The European Train Control System (ETCS) which is a standardized solution for signaling, control and monitoring of high-speed trains. In the case of Level 2 ETCS, all trains automatically report their exact position and direction of travel to the Radio Block Centre (RBC) at regular intervals. Train movements are monitored continually by the radio block centre. Another example of infrastructure that monitors train position includes the Italian Sistema Controllo Marcia Treno (SCMT). Sensors/Transponders are placed at various points on the track. When the train passes the information point, it is provided information about the next signal and other information. Such a system can be implemented to provide information regarding the position of the train. In situations where the base stations manage the handovers, the position information may be provided directly to the base stations. For the examples discussed herein however, the position information is received at the network controller 116.

As described below with reference to FIG. 1B, reduced messaging handover procedures are typically managed by the base stations. The base stations exchange messages to perform the handover of the mobile wireless communication device 108 from the first base station (source base station) 102 to the second base station (target base station) 104. Messaging performed within the system during the handover procedure is discussed in further detail with reference to FIG. 3 and FIG. 4. In the typical handover operation, the source base station (first base station 102) communicates directly with the target base station (second base station 104) over the X2 interface without additional management by the network controller 116. In situations who a direct link between the base stations is not as (i.e., no X2 link) or the base stations are associated with different network controllers 116, the network controller (s) 116 assist with handover procedures by routing the handover messages from the source base station to the target base station. As discussed below in further detail, the controller 116 instructs the mobile wireless communication device 108 to invoke the reduced messaging handover procedure when the speed of the mobile wireless communication device relative to the base stations exceeds a threshold speed. When the mobile wireless communication device is traveling at high speed (a speed above the threshold, therefore, the mobile wireless communication device does not send or receive at least some of the conventional messages. For the examples, the first base station and the second base station exchange messages to manage the handover of the mobile wireless communication device from the first base station to the second base station. In some situations, it may be necessary, or preferred, to allocate at least some management to the network controller 116.

Figure 1B:
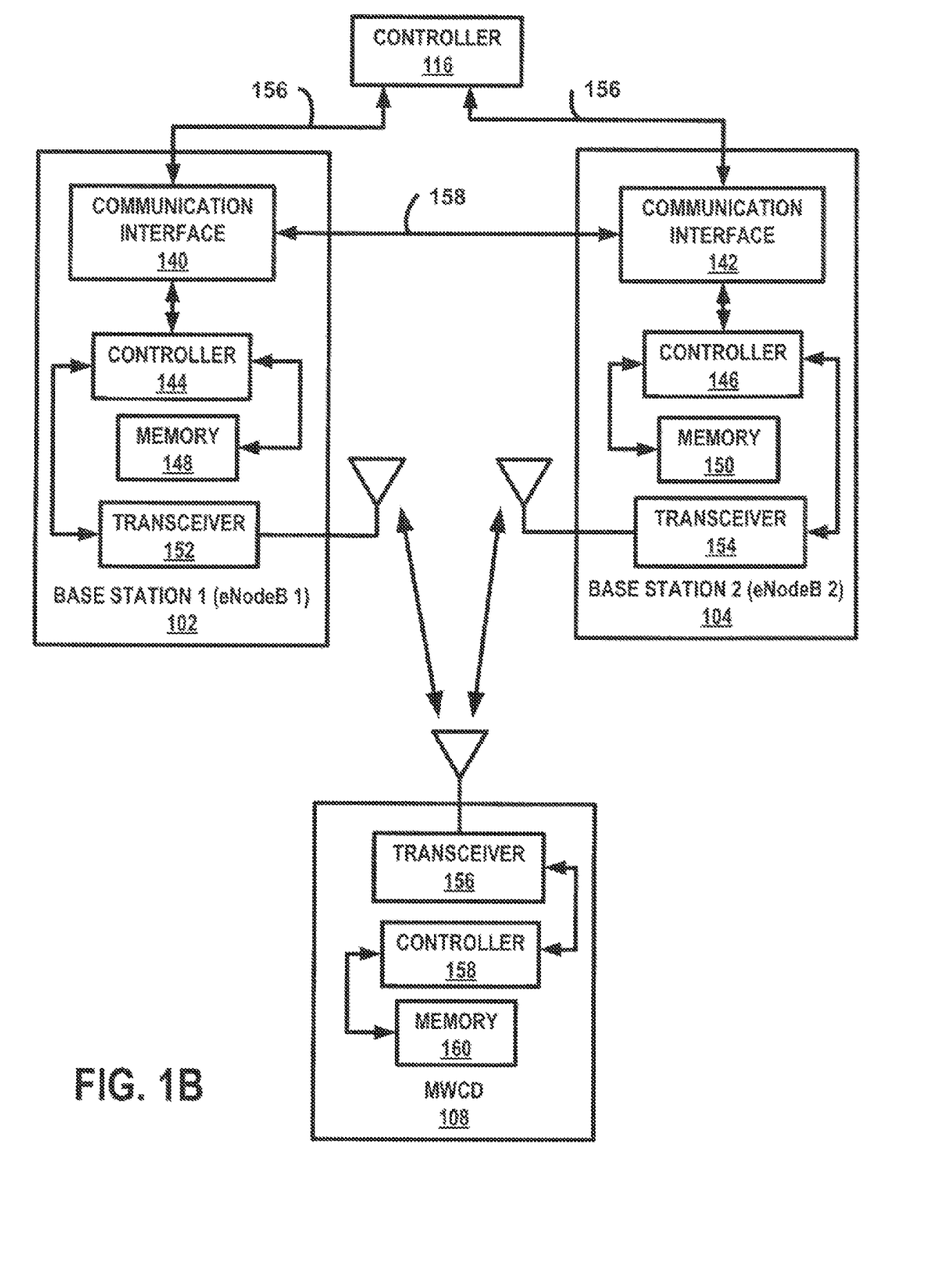
FIG. 1B is a block diagram of the base stations connected to the controller and communicating with a mobile wireless communication device.

FIG. 1B is a block diagram of the first base station 102 and the second base station 104 connected to a controller 116. Each base station includes a communication interface 140, 142, a controller 144, 146, a memory 148, 150, and transceiver 152, 154 as well as other components and circuitry (not shown). Each of the transceivers 152, 154 transmits downlink wireless signals to mobile wireless communication devices and receives uplink wireless signals from mobile wireless communication devices. Each controller 144, 146 controls components of the base station to manage the functions of the base station described herein as well as to facilitate the overall functionality of the base station 102, 104. Each controller 144, 146 is connected to a memory 148, 150 which can be any suitable memory storage device capable of storing code and data. For the examples, each communication interface 140, 142 communicate with the network controller 116 and other base stations. The communication links between the network controller and the communication interface are in accordance with S1 signaling protocols and techniques while the communication links between base stations are in accordance with X2 signaling protocols and techniques. Accordingly, the network controller 116 is connected to the base stations through S1 communication links 156 and the base stations are connected to each other through an X2 communication link 158. Other communication links can be used in some circumstances.

Each of the mobile wireless communication devices includes a transceiver 156 a controller 158, and a memory 160 and as well as other components and circuitry (not shown). The transceiver 156 transmits uplink wireless signals to base stations and receives downlink wireless signals from the base stations. The controller 158 controls components of the mobile wireless communication device to manage the functions of the device described herein as well as to facilitate the overall functionality of the device. The controller 158 is connected to the memory 160 which can be any suitable memory storage device capable of storing code and data.

Figure 2:
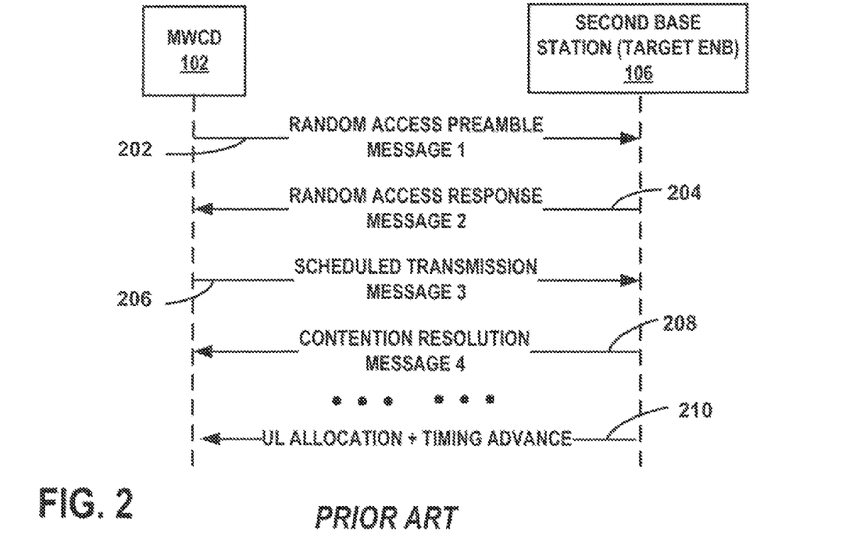
FIG. 2 is a messaging diagram between a mobile wireless communication device end a target base station during a conventional handover.

FIG. 2 is a messaging diagram between a mobile wireless communication device and a target base station during a conventional handover. After a handover decision is made, the mobile wireless communication device determines if contention resolution is required. If no dedicated preamble is assigned, the mobile wireless communication device chooses one of the available random access preamble signatures with the result that it is possible for more than one mobile wireless communication device to simultaneously transmit the same signature, leading to a need for a contention resolution process. The mobile wireless communication device transmits the random access preamble over the Physical Random Access Channel (PRACH) to the target base station. The target base station responds with a random access response message 204. The random access response message includes information that allows the mobile wireless communication device to transmit a schedule transmission message to the target base station and the appropriate timing advance to use. The target base station transmits a contention resolution message that is a mirror of the scheduled transmission message 206. The message is sent downlink shared channel and addressed to the mobile wireless communication device using a temporary C-RNTI. When the received message matches the scheduled transmission message 206, the contention resolution is considered successful. At message 210, the target base station provides the mobile wireless communication device with uplink channels which allows the mobile wireless to communicate with the target base station.

Figure 3:
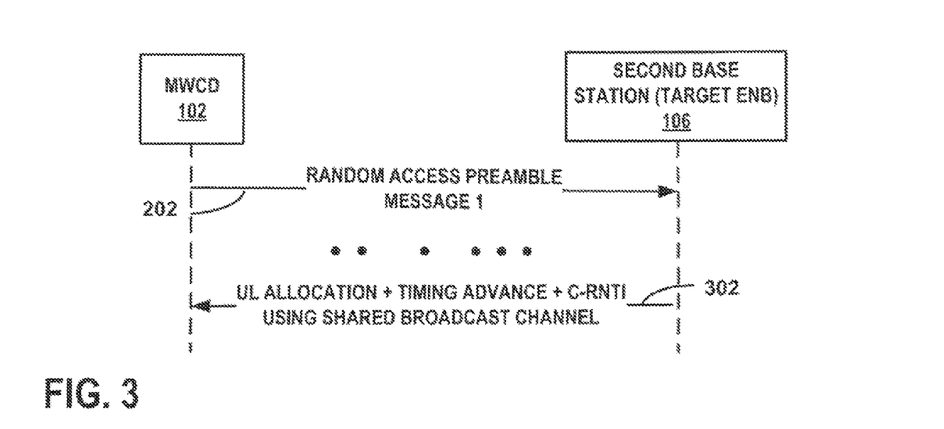
FIG. 3 is a messaging diagram of communications between a mobile wireless communication device and a target base station during a handover in accordance with a first example of the invention.

FIG. 3 is a messaging diagram of communications between a mobile wireless communication device and a target base station during a handover in accordance with a first example of the invention. For the first example, the mobile wireless communication device transmits random access preamble message in accordance with conventional systems. Other conventional contention resolution messages, however, are eliminated by sending a single message from the target base station to the mobile wireless communication device that includes all additional handover information that the mobile wireless communication device requires to execute the handover. The broadcast message 302 includes, for example, an uplink allocation and timing advance. In some circumstances, the broadcast also include a C-RNTI, in the example, the base station tracks the mobile wireless communication devices and is aware of which mobile wireless communication devices will go through a non-conventional handover. The target eNB 106, therefore, knows the C-RNTIs of the candidate mobile wireless communication devices(s) so the eNB can send message 302 by using the existing C-RNTI of the mobile wireless communication device from the source cell. If the C-RNTI is already used in the target cell for another mobile wireless communication device, the conventional handover would be applied to those candidate devices.

Figure 4:
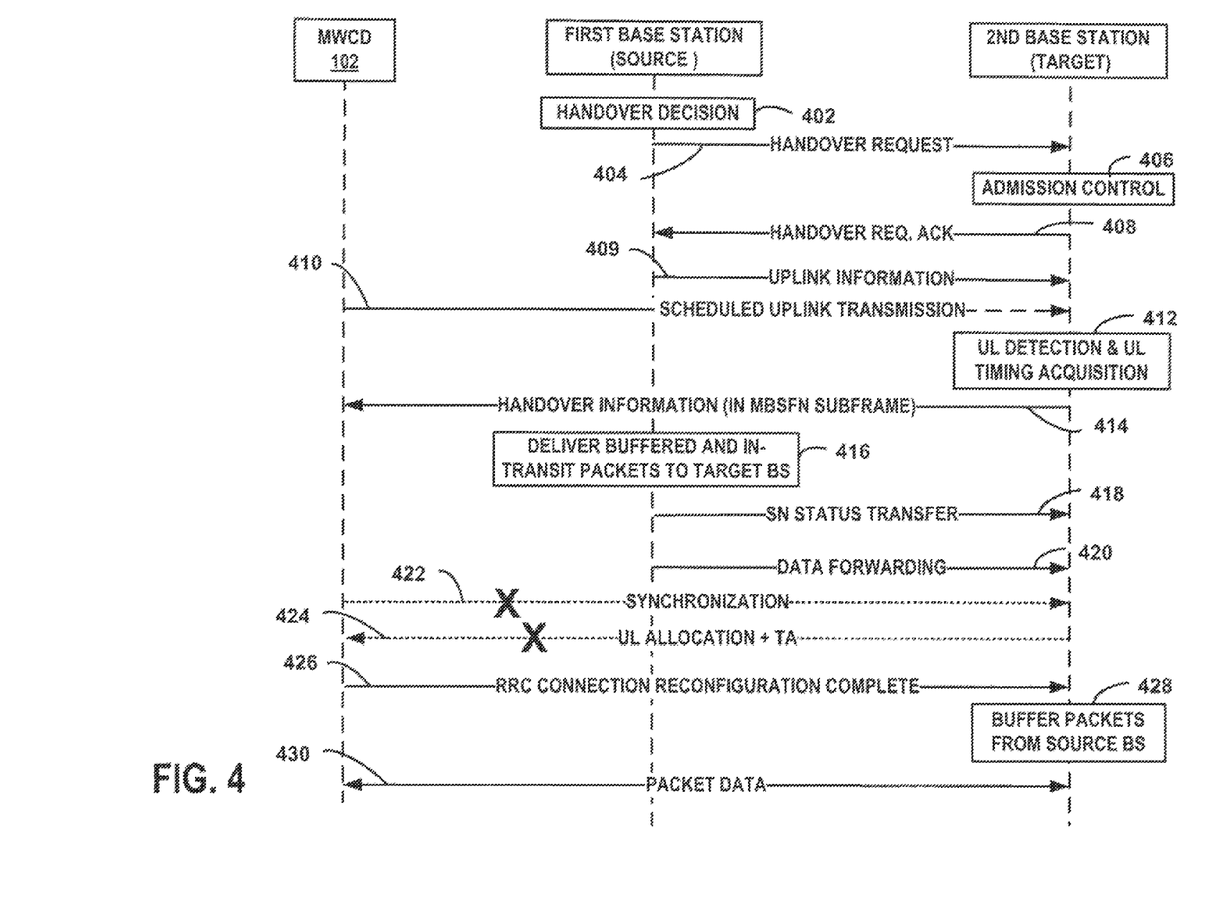
FIG. 4 is a messaging diagram of communications between a mobile wireless communication device and a target base station during a handover accordance with a second example of the invention.

FIG. 4 is a messaging diagram of communications between a mobile wireless communication device and a target base station during a handover in accordance with a second example of the invention. For the second example, all synchronization related messaging is eliminated. Therefore, the messages described with reference to FIG. 2 are eliminated. This includes all the messages described in FIG. 2. The target base station monitors uplink channels assigned to the mobile wireless communication device, determines timing advance from the uplink transmissions, and broadcasts the handover information to the mobile wireless communication device using MBSFN, for example. Since the broadcast handover information is broadcast, the mobile wireless communication device is able to receive the handover information directly from the target cell while the mobile wireless communication device is still served by the source cell. Although the source cell and the target cell are synchronized, the mobile wireless communication does not generally listen to the target cell until the synchronization procedure (RA procedure) takes place. The use of a broadcast channel, such as MBSFN, allows this possibility since the mobile wireless communication device is monitoring the MBSFN subframe which is common to it cells in that frequency.

At event 402, the first base station 102 makes a handover decision to handover the mobile wireless communication device from the first base station to the second base station. The handover decision may be a conventional handover decision in response to a measurement report from the mobile wireless communication device. The handover decision may also be based on the location of the mobile wireless communication device as tracked by the position monitor 126. If the first base station knows that the mobile wireless communication device is within the overlap region 120, the first base station may decide to handover the mobile wireless communication device to the second base station.

At event 404, a handover request is sent from the first base station (source) to the second base station (target). The handover request is a conventional handover request in the example. Therefore, the source base station issues the handover request message to the target base station passing necessary information to prepare for the handover at the target side.

At event 406, the target base station performs admission control.

At event 408, the second base station returns a handover request acknowledgment to the first base station. The handover request acknowledgment is a conventional handover request acknowledgment in the example. The target base station prepares for the transition with L1/L2 and sends the HANDOVER REQUEST ACKNOWLEDGE to the source base station.

At event 409, the first base station sends uplink information to the second base station. The uplink information is any kind of indicator, information, or message that allows the second base station to identify and receive a scheduled transmission from the mobile wireless communication device. The uplink information also includes the C-RNTI associated with the mobile wireless communication device. The first base station is aware of the uplink transmission schedule of the mobile wireless communication device and therefore, can forward the information to the second base station, in order to assist the target base station to detect the scheduled uplink transmission, the target base station is provided information about the mobile wireless communication device's Timing Advance being used with the source base station and the source and target base stations have information about positions of their cells relative to each other. In some circumstances the uplink information may be sent at a different time or as part of another message. For example, the uplink information could be sent with the handover request, in some circumstances.

At event 410, the scheduled uplink transmission is transmitted from the mobile wireless communication device to the first base station. The schedule uplink transmission is a transmission that is intended for the first base station but can be received by the second base station. As an example, it may be assumed that the first base station has configured the UE to transmit SRS (Sounding Reference Signal) within those uplink transmissions. The SRS transmission are primarily used for channel quality estimation to enable frequency-selective scheduling on the uplink but may also provide the first based as well as the second base station in this case with an accurate estimate of the Timing Advance. If there are no scheduled uplink transmissions during the handover process, the first base station could optionally request the mobile wireless communication device to send a measurement report thereby scheduling a transmission from the mobile wireless communication device.

At event 412, the second base station detects the scheduled transmission and determines the uplink timing advance. The second base station, using the uplink information received at event 409, receives the uplink transmission transmitted by the mobile wireless communication device.

At event 414, the second base station transmits the handover information to the mobile wireless communication device. In the example, the handover information is transmitted over a MBSFN subframe. Accordingly, the mobile wireless communication device can receive and decode the message. The handover information includes timing advance determined at event 412 as well as other handover information that allows the mobile wireless communication device to receive wireless service from the second be station. For the example, the uplink allocation and a C-RNTI are included in the handover information. In some circumstances the C-RNTI used by the first base station may be used by the second base station. Accordingly, the C-RNTI may be omitted from the handover information in some cases. The mobile wireless communications device 108 is expecting that a target base station can transmit a message over MBSFN.

At event 416, buffered and in-transit packets are delivered to the target base station.

At event 418, the source base station sends the SN STATUS TRANSFER message to the target base station to convey the uplink PDCP SN receiver status and the downlink PDCP SN transmitter status of E-RABs for which PDCP status preservation applies (i.e., for RLC AM). The uplink PDCP SN receiver status includes at least the PDCP SN of the first missing UL SDU and may include a bit map of the receive status of the out of sequence UL SDUs that the UE needs to retransmit in the target cell, if there are any such SDUs. The downlink PDCP SN transmitter status indicates the next PDCP SN that the target eNB shall assign to new SDUs, not having a PDCP SN yet. The source eNB may omit sending this message if none of the E-RABs of the UE shall be treated with PDCP status preservation.

At event 420, data is forwarded from the source base station to the target base station.

Event 422 represents synchronization that occurs in conventional systems but is eliminated in the example in accordance with the invention.

Event 424, represents the transmission of uplink allocation and timing advance information that occurs in conventional systems but is eliminated in the example in accordance with the invention. The handover information is transmitted over the MBSFN sub-frames as explained above. Accordingly, the large "X" over the lines in the FIG. 4, indicates that the transmission is not present in the discussed example.

At step 426, the mobile wireless communication device sends an RRC connection reconfiguration complete message to the second base station in accordance with conventional techniques. In the example, the mobile wireless communication device can still receive the remaining sub-frames from the source base station within the frame after receiving the MBSFN subframe with the Handover information 414 from the target BS. This assumes the handover occurs at a frame boundary. After decoding the last subframe within a frame from the source base station the mobile wireless communication device can transmit an RRC Connection Reconfiguration Complete message to the target base station. Alternatively, the mobile wireless communication device may be configured to receive a MBSFN subframe with the Handover information 414 on the last subframe of a frame. Therefore the mobile wireless communication device transmits the RRC Connection Reconfiguration Complete message immediately after receiving the Handover information 414.

At event 428, data packets from the source base station are buffered at the target base station.

At events 430, the target base station exchanges data with the mobile wireless communication device.

Additional messages may be sent in accordance with known techniques to finalize the transition of service from the first base station to the second base station. An example includes transmission of a PATH SWITCH REQUEST message from the target base station to MME in the network controller to inform network controller that the mobile relay has changed cells. Another example includes a MODIFY BEARER REQUEST message from the MME to the Serving Gateway. The Serving Gateway then switches the downlink data path to the target side. The Serving Gateway sends one or more "end marker" packets on the old path to the source base station and then can release any U-plane/TNL resources towards the source base station.

Clearly, other embodiments and modifications of this invention will occur readily to those of ordinary skill in the art in view of these teachings. The above description is illustrative and not restrictive. This invention is to be limited only by the following claims, which include all such embodiments and modifications when viewed in conjunction with the above specification and accompanying drawings. The scope of the invention should, therefore, be determined not with reference to the above description, but instead should be determined with reference to the appended claims along with their full scope of equivalents.

The invention claimed is:

1. A communication network comprising:
a source base station providing wireless communication service to a mobile wireless communication device;
a target base station time synchronized to the source base station and broadcasting, to the mobile wireless communication device, handover information over a broadcast channel shared by the source base station and the target base station, the handover information necessary for the mobile wireless communication device to perform a handover from the source base station to the target base station; and
a position monitor providing position information related to a position of the mobile wireless communication device, the target base station broadcasting the handover information at a time at least partially based on the position information.

2. The communication network of claim 1, wherein the handover information is broadcast within a Multicast Broadcast Multimedia Services (MBMS) Single Frequency Network (MBSFN) subframe.

3. The communication network of claim 2, wherein the handover information comprises uplink signal allocation identifying uplink resources assigned to the mobile wireless communication device.

4. The communication network of claim 2, wherein the handover information comprises a timing advance for use by the mobile wireless communication device to adjust transmission timing of uplink signals such that the uplink signals arrive at the target base station within a desired time window.

5. The communication network of claim 2, wherein the handover information comprises a Cell Radio Network Temporary Identifier (C-RNTI).

6. The communication network of claim 2, the C-RNTI is used by the source base station for communication with the mobile wireless communication device.

7. The communication network of claim 2, wherein the target base station refrains from transmitting a contention resolution message.

8. The communication network of claim 1, wherein the target base station broadcasts the handover information to the mobile wireless communication device in response to receiving a Random Access Preamble message from the mobile wireless communication device.

9. The communication network of claim 8, wherein the target base station refrains from sending a Random Access Response message in response to receiving the Random Access Preamble message from the mobile wireless communication device.

10. The communication network of claim 1, wherein the target base station broadcasts the handover information to the mobile wireless communication device in response to receiving a handover request message from the source base station and receiving a scheduled uplink transmission from the mobile wireless communication device.

11. The communication network of claim 10, wherein the source base station transmits a measurement report request to the mobile wireless communication device and the scheduled uplink transmission is a response to the measurement report request.

12. The communication network of claim 11, wherein the handover request message comprises:
a C-RNTI of the mobile wireless communication device.

13. The communication network of claim 11, wherein the handover request message comprises:
a timing advance currently used by the source base station for communication with the mobile wireless communication device.

14. The communication network of claim 11, wherein the handover request message comprises:
a relative position between a source cell provided by the source base station and a target cell provided by the target base station.

15. The communication network of claim 11, wherein the target base station requests a measurement report from the mobile wireless communication device in response to determining that there are no uplink transmissions scheduled from the mobile wireless communication device during the handover and wherein the measurement report is the scheduled uplink transmission.

16. A mobile wireless communication device comprising:
a receiver configured to receive a Multicast Broadcast Multimedia Services (MBMS) Single Frequency Network (MBSFN) subframe; and
a controller coupled to the receiver, the controller configured to process the MBMS MBSFN subframe, which comprises handover information necessary for the wireless communication device to perform a handover to a base station from another base station, the MBMS MBSFN subframe broadcasted at a time at least partially based on a position of the mobile wireless communication device and over a broadcast channel shared by both base stations.

17. The mobile wireless communication device of claim 16, wherein the handover information comprises uplink signal allocation identifying uplink resources assigned to the mobile wireless communication device.

18. The mobile wireless communication device of claim 16, wherein the handover information comprises a timing advance for use by the mobile wireless communication device to adjust transmission timing of uplink signals such that the uplink signals arrive at the base station within a desired time window.

19. The mobile wireless communication device of claim 16, wherein the handover information comprises a Cell Radio Network Temporary Identifier (C-RNTI).

20. The mobile wireless communication device of claim 16, wherein the mobile wireless communication device receives the MBSFN subframe comprising the handover information without receiving a contention resolution message.

21. The mobile wireless communication device of claim 16, wherein the mobile wireless communication device is configured to transmit a Random Access Preamble message to provide transmission of the handover information.

22. The mobile wireless communication device of claim 16, wherein the mobile wireless communication device is configured to transmit a scheduled uplink transmission and wherein the handover information is broadcast from the base station in response to a handover request message received from the another base station.

23. A base station comprising:
a transmitter configured to transmit a Multicast Broadcast Multimedia Services (MBMS) Single Frequency Network (MBSFN) subframe; and
a controller coupled to the transmitter, the controller configured to process the MBMS MBSFN subframe, which comprises handover information necessary for a wireless communication device to perform a handover to the base station from a source base station, the transmitter configured to transmit the MBMS MBSFN subframe at a time at least partially based on a position of the wireless communication device and over a broadcast channel shared by the base station and the source base station.

24. The base station of claim 23, wherein the handover does not include random access messages.

25. The base station of claim 24, wherein the handover does not include messages related to synchronization.

* * * * *